United States Patent
McCarthy

(10) Patent No.: US 9,553,419 B2
(45) Date of Patent: Jan. 24, 2017

(54) SHARED MULTI-WAVELENGTH LASER RESONATOR WITH GAIN SELECTED OUTPUT COUPLING

(71) Applicant: BAE Systems Information and Electronic Systems Integration Inc., Nashua, NH (US)

(72) Inventor: John C McCarthy, Newmarket, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/827,549

(22) Filed: Aug. 17, 2015

(65) Prior Publication Data

US 2016/0056605 A1 Feb. 25, 2016

Related U.S. Application Data

(60) Provisional application No. 62/040,449, filed on Aug. 22, 2014.

(51) Int. Cl.

| H01S 3/07 | (2006.01) |
|---|---|
| H01S 3/08 | (2006.01) |
| H01S 3/113 | (2006.01) |
| H01S 3/10 | (2006.01) |
| H01S 3/0941 | (2006.01) |
| H01S 3/108 | (2006.01) |
| H01S 3/109 | (2006.01) |
| H01S 3/131 | (2006.01) |

(52) U.S. Cl.
CPC ............. *H01S 3/07* (2013.01); *H01S 3/08072* (2013.01); *H01S 3/113* (2013.01); *H01S 3/09415* (2013.01); *H01S 3/109* (2013.01); *H01S 3/10061* (2013.01); *H01S 3/1083* (2013.01); *H01S 3/1312* (2013.01)

(58) Field of Classification Search
CPC ............. H01S 3/11; H01S 3/108; H01S 3/094
See application file for complete search history.

(56) References Cited

U.S. PATENT DOCUMENTS

| 5,311,352 A * | 5/1994 | Bierlein ................ G02F 1/3553 252/584 |
|---|---|---|
| 5,396,506 A | 3/1995 | Ball |
| 5,802,086 A | 9/1998 | Hargis et al. |
| 6,327,281 B1 | 12/2001 | Yin |
| 6,356,088 B1 | 3/2002 | Simon et al. |
| 6,493,090 B1 | 12/2002 | Lading et al. |
| 6,697,411 B2 | 2/2004 | Hoose et al. |
| 7,760,774 B2 | 7/2010 | Karpushko |
| 7,792,162 B2 | 9/2010 | Piper et al. |
| 2008/0144690 A1 * | 6/2008 | Mitchell ............. H01S 3/09415 372/70 |

(Continued)

FOREIGN PATENT DOCUMENTS

JP 10093182 5/1997

*Primary Examiner* — Dung Nguyen
(74) *Attorney, Agent, or Firm* — Maine Cernota & Rardin; Daniel J. Long; Scott J. Asmus

(57) ABSTRACT

The present invention provides improved laser beam quality with fewer parts than the current method demands and decreasing the transmit aperture, said apparatus comprising: two or more independently pumped gain modules, two or more pump diodes, a polarizing waveplate, non-linear optical crystals, and a passive Q-switch.

19 Claims, 3 Drawing Sheets

(56) References Cited

U.S. PATENT DOCUMENTS

2010/0142962 A1 6/2010 Poustie et al.
2010/0220753 A1 9/2010 Georges
2013/0294465 A1* 11/2013 Chang .................... H01S 3/108
  372/10

* cited by examiner

SHARED MULTI-WAVELENGTH LASER RESONATOR WITH GAIN SELECTED OUTPUT COUPLING

RELATED APPLICATIONS

This application claims the benefit of U.S. Provisional Application No. 62/040,449, filed Aug. 22, 2014. This application is herein incorporated by reference in its entirety for all purposes.

FIELD OF THE INVENTION

The present invention relates to laser transmitters and, more particularly, to laser transmitters for precision targeting applications.

BACKGROUND OF THE INVENTION

The prior art discloses a number of ways to achieve multi-wavelength laser transmission.

United States Patent Application Publication 2010/0220753, for example, concerns a monofrequency, intra-cavity, frequency-tripled, continuous laser. This assembly is a diode-pumped device. It includes an amplifying medium, two birefringent non-linear mediums for frequency doubling and tripling, and a polarizing medium used as a Lyot filter adapted to allow monofrequency output emission.

This invention, US 2010/0220753, is a method for generation of a Continuous Wave (CW), monofrequency UV laser source using intra-cavity, temperature controlled, birefringent non-linear converters, driven by a Nd based diode pumped laser operating at ~1 µm.

United States Patent Application Publication 2010/0142962 involves a multiwavelength transmitter comprised of several laser sources and electroabsorption modulators. The lasers are configured to generate differing wavelengths and the modulators are configured to match the lasers, modulating one corresponding wavelength.

U.S. Pat. No. 7,792,162 features a selectable multiwavelength laser for outputting visible light. This assembly is comprised of a laser capable of producing multiple wavelengths simultaneously to resonate in a cavity. One of the frequencies is generated by a Raman crystal. A tunable non-linear medium is positioned within the cavity for frequency conversion, and a tuner is used to tune it to select a wavelength for conversion. The output beam from this assembly is used for treatment, detection, and diagnosis of patients in ophthalmology and dermatology.

Comprised of a single gain element, Q-Switch, and multiple intra-cavity non-linear converters, using both folded and liner cavity configurations with multiple partially reflective output mirrors to outcouple laser light of varying wavelengths, this invention, U.S. Pat. No. 7,792,162, is optically complex, requires removal and replacement of various intra-cavity, elements to achieve particular sets of multiple wavelengths, and in each case requires a combination of angle and/or temperature tuning to attain specific wavelengths.

U.S. Pat. No. 6,356,088 concerns a compact laser scanning microscope with an integrated short-pulse laser. This assembly is useful for multiphoton microscopy for three-dimensionally resolved microscopic analysis because it circumvents optical direct coupling and fiber coupling. It is used for analysis of materials, particularly for optical beam induced current analysis.

U.S. Pat. No. 6,356,088 utilizes multiple wavelengths using lasers sources in ultrafast regime which are combined and converted with various non-linear converters similar to that described in U.S. Pat. No. 7,792,162 but configures the laser to be consistent with small volume packaging for an advanced compact laser scanning microscope.

An improved way, however, is still necessary to achieve better laser beam quality using fewer parts while allowing for a decrease in the size of the transmit aperture.

SUMMARY OF THE INVENTION

The invention described herein produces high peak-power, Q-switched pulses suitable for applications requiring long range, multi-wavelength, high peak power projection such as laser target designation and marking and laser range-finding, in particular, and a variety of other applications, in general.

The current invention differs from those of the prior art in that it utilizes two diode end-pumped gain elements in combination with a simple folded cavity using a dual wavelength intra-cavity polarizer, to provide significant improvements in the stat-of-the-art for low weight, compact laser target designators/markers and eyesafe laser rangefinders. Employing dual end-pumped gain elements allows for electronic wavelength selection (immediate switching with moving parts), active control of pumping levels providing uniform induced thermal lensing regardless of operating mode; which in turn allows for fixed optical compensation of the induced thermal lens providing higher brightness laser output. For the passively Q-switched embodiment the complexity of active electro-optic Q-switching is eliminated.

One embodiment of the present invention provides a shared multi-wavelength laser resonator with gain selected outcoupling, the laser resonator comprising: first and second independently pumped gain modules defining a lasing plane; first and second pump diodes positioned in the lasing plane, defining proximal and distal ends of the lasing plane, respectively, wherein the first pump diode is in optical communication with the first independently pumped gain module and wherein the second pump diode is in optical communication with the second independently pumped gain module; at least one polarizing waveplate positioned in the lasing plane, adjacent the second independently pumped gain element, opposite the second pump diode, wherein the polarizing waveplate is in optical communication with the second independently pumped gain modules; at least one polarizer positioned in the lasing plane and configured to act as a polarizer at both 1 µm and 1.5 µm; a plurality of non-linear optical crystals positioned in the lasing plane, adjacent the first independently pumped gain element, opposite the first pump diode, wherein the plurality of non-linear optical crystals are in optical communication with the first independently pumped gain module and oriented to convert only S-polarized light; and a passive Q-switch positioned in the lasing plane between the non-linear optical crystals and the first independently pumped gain element; wherein the system is capable of allow for output selection by choosing between the pump diodes.

Another embodiment of the present invention provides such a lasing apparatus wherein output is selectable between 1 µm and 1.5 µm.

A further embodiment of the present invention provides such a lasing apparatus wherein the polarizer acts as both a high reflector for S polarized 1.5 µm light and a polarization outcoupler for P polarized 1 µm light.

Yet another embodiment of the present invention provides such a lasing apparatus wherein the waveplate is an adjustable quarter-waveplate to provide 1 µm polarized output.

A yet further embodiment of the present invention provides such a lasing apparatus wherein the Q-switch is a passive Q-switch.

Still another embodiment of the present invention provides such a lasing apparatus wherein any path saturation of the passive Q-switch is adjusted by load balancing between the plurality of non-linear optical crystals.

A still further embodiment of the present invention provides such a lasing apparatus wherein the gain modules are pumped in a complimentary manner to induce a constant net thermal lens of the resonator.

Even another embodiment of the present invention provides such a lasing apparatus wherein the waveplate is configured to impart appropriate polarization rotation to enter a parallel oscillation state.

An even further embodiment of the present invention provides such a lasing apparatus wherein the waveplate is configured to impart appropriate polarization rotation to enter a senkrecht oscillation state.

A still even another embodiment of the present invention provides such a lasing apparatus wherein the wavelength of laser radiation emitted by the system may be controlled through frequency conversion, enabled by the non-linear optical crystals.

A still even further embodiment of the present invention provides such a lasing apparatus wherein the Q-switch is comprised of an ion-doped crystal.

Still yet another embodiment of the present invention provides such a lasing apparatus wherein the ion-doped crystal is Cr:YAG.

A still yet further embodiment of the present invention provides such a lasing apparatus wherein the first gain element comprises dual high-reflection (HR) coatings adjacent the first pump diode.

Even yet another embodiment of the present invention provides such a lasing apparatus wherein the first pump diode is a high-power, quasi-continuous wave light source type pump diode.

An even yet further embodiment of the present invention provides such a lasing apparatus wherein the second gain element comprises a single HR coating adjacent the second pump diode.

Still even yet another embodiment of the present invention provides such a lasing apparatus wherein the second pump diode is a high-power, quasi-continuous wave light source type pump diode.

A still even yet further embodiment of the present invention provides such a lasing apparatus wherein the gain elements are comprise Nd:YAG.

Yet still even another embodiment of the present invention provides such a lasing apparatus wherein the non-linear optical crystals may be used as frequency doublers, providing second harmonic generation.

A yet still even further embodiment of the present invention provides such a lasing apparatus wherein the non-linear optical crystals may be used as optical parametric oscillators.

A still yet another further embodiment of the present invention provides such a lasing apparatus wherein the laser operates in the 1530 to 1620 nm spectral range, resulting in a raised eye-retina damage threshold as compared to 1064 nm lasers.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention provides an apparatus capable of producing a laser beam of improved quality while using fewer parts and decreasing the required transmit aperture as compared to current state of the art lasing apparatuses and systems. This system, in embodiments, is comprised of five principal components: independently pumped gain modules 108, pump diodes 102/118, a quarter-wave polarization rotating waveplate 116, non-linear optical (NLO) crystals 112, and a passive Q-switch 110.

Figure 1:
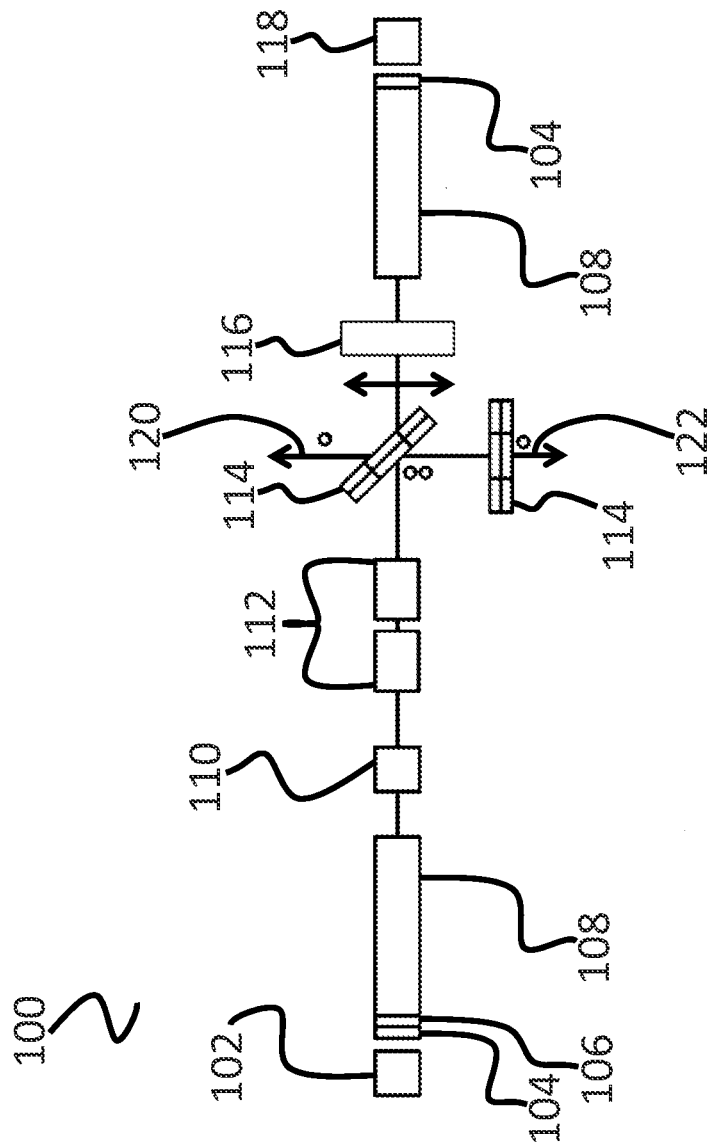
FIG. 1 is a schematic drawing of the present invention, a shared multi-wavelength laser resonator with gain selected outcoupling, configured in accordance with one embodiment of the present invention.

In the improved system, the gain modules 108, as shown in FIG. 1, control the lasing wavelength (X) as well as the method of output coupling. These gain modules 108 are pumped in a complimentary manner to induce a constant net thermal lens of the resonator and control which wavelength is emitted. Thermal lensing in traditional systems results from absorption of electromagnetic radiation by the lensing medium, resulting in thermal deformation of the lensing medium and a change in the material's refractive index. Keeping the thermal lens constant by proportionally pumping one or both gain modules 108 allows the use of fixed optical compensation, providing for stable, high-brightness operation over a range of average powers and operating temperatures.

The pump diodes 102/118 of the improved apparatus provide flexible pumping for the apparatus. This flexibility allows for a constant resonator thermal lens. Additionally, such a configuration reduces timing jitter, by providing active pump diode feedback control. In typical passively Q-switched lasers, fluctuations of pump power lead to timing jitter, as a pulse is emitted as soon as the laser gain becomes high enough to overcome the losses. The design of the current system minimizes this effect.

The waveplate 116, in embodiments, is an intracavity 1 µm quarter waveplate 116. A waveplate 116 is an optical device that alters the polarization state of a light wave travelling through it. Two common types of waveplates 116 are the half-wave plate, which shifts the polarization direction of linearly polarized light, and the quarter-wave plate, which converts linearly polarized light into circularly or elliptically polarized light and vice versa.

In embodiments, the quarter-waveplate 116 may be configured such that waves enter either parallel (P) or S oscillation states. In such embodiments, the polarizer 114 acts as both a polarization outcoupler for the 1 micron laser and a high reflector (HR) at 1.5 μm for the S-polarized 1.5 micron laser. Additionally, the polarizer 114 operates equivalently at both wavelengths.

The NLO crystals 112 allow for the frequency conversion of the laser light. Through frequency conversion enabled by the NLO crystals 112, the wavelength of laser radiation emitted by the system is controlled by the gain level on either side of the polarizer in common oscillator. NLO crystals 112 are media in which the dielectric polarization responds nonlinearly to the electric field of the light. This nonlinearity is typically only observed at very high light intensities such as those provided by lasers.

The passive Q-switch 110 is common to both/all of the lasers in the system and operates in both P and S polarization states, while the NLO 112 crystals convert only for S-circulating polarized light. Q-switching is a technique for obtaining energetic short pulses from a laser by modulating the intracavity losses and thus the Q factor of the laser resonator. The Q-switch 110 of embodiments of the current disclosure is located in a shared cavity. In the case of passive Q-switching, as in embodiments of the current disclosure, the Q-switch 110 is a saturable absorber, a material whose transmission increases when the intensity of light exceeds a predetermined threshold. The material may be an ion-doped crystal like Cr:YAG, a bleachable dye, or a passive semiconductor device.

In such a setup, initially, the loss of the absorber is high, but still low enough to permit some lasing once a large amount of energy is stored in the gain medium. As the laser power increases, it saturates the absorber, allowing the power to increase more quickly. This brings the absorber into a state with low losses, allowing efficient extraction of the stored energy by the laser pulse. After the pulse, the absorber recovers to its high-loss state before the gain recovers, so that the next pulse is delayed until the energy in the gain medium is fully replenished.

The improved device, in embodiments, comprises at least two independently pumped gain modules 108, at least two pump diodes 102/118, a polarizer 114, a quarter-waveplate 116, a plurality of non-linear optical (NLO) crystals 112, and a passive Q-switch 110.

Now referring to FIG. 1, a schematic drawing of the present invention, a shared multi-wavelength laser resonator with gain selected outcoupling, in accordance with one embodiment of the present invention, is shown. In the embodiment shown, the components are connected as follows: the first gain element 108, is in optical communication with a passive Q-switch 110, this passive Q-switch 110 is in further optical communication with NLO crystals 112, the NLO crystals 112 are then in still further optical communication with a polarizer 114, the polarizer 114 is then configured to optically communicate with a waveplate 116, finally, the waveplate 116 is in optical communication with an additional gain element 108.

Each gain element 108 shown in FIG. 1 may beneficially be end-diode pumped, wherein pumping is the act of energy transfer from an external source into the gain element 108 of a laser. The energy is absorbed in the gain element 108, producing excited states in its atoms. When the number of particles in one excited state exceeds the number of particles in the ground state, or a less-excited state, population inversion is achieved. In this condition, stimulated emission can take place and the gain element, or elements, 108 can act as a laser.

In such an embodiment, the gain element 108 of FIG. 1, having dual high-reflection (HR) coatings, 1 micron 104 and 1.5 micron 106, is situated adjacent the high power, quasi-continuous wave light source pump diode 102, wherein the end of the gain element 108 having the HR coatings 104/106 is positioned nearest the high power, quasi-continuous wave light source pump diode 102. The gain element 108 having a single HR coating 1 micron 104 is situated adjacent the microfiber knot resonator pump diode 118, wherein the side of the gain element 108 having the HR coatings 104 is positioned nearest the high-power, quasi-continuous wave light source pump diode 102.

In embodiments, Nd:YAG may be used as the gain element 108. In other embodiments, Potassium Titanium Oxide Phosphate (KTiOPO4 or KTP), NLO crystals 112 may also be used as frequency doublers, providing second harmonic generation (SHG), or as optical parametric oscillators (OPOs). Although KTP is most commonly used with Nd:YAG gain elements, it may also be used with other neodymium doped gain elements 108.

KTP is an efficient nonlinear optical crystal in the visible to infrared spectral region with relatively low cost having a large nonlinear coefficient, the effective nonlinear optical coefficient of KTP deff at 1064 nm being more than 1.5 times that of Beta-Barium Borate (β-BaB2O4 or BBO), a common NLO crystal. It is particularly suited to high power operation as an OPO due to its high damage threshold and large crystal aperture, while offering efficient frequency conversion (1064 nm SHG conversion efficiency is about 80%)

Figure 2:
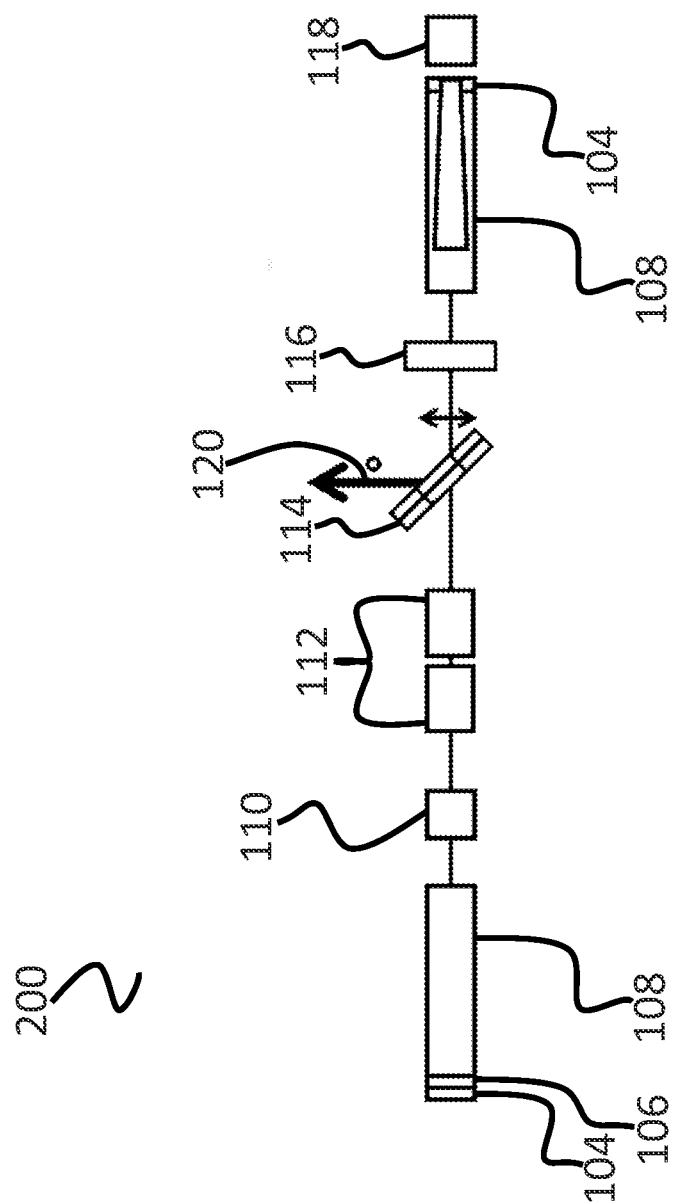
FIG. 2 is a schematic drawing of a 1 µm marker laser, configured in accordance with one embodiment of the present invention.

Now referring to FIG. 2, a schematic drawing of a 1 μm marker laser 200 in accordance with one embodiment of the present invention is shown. This figure shows the selection of the 1 μm marker laser 200 operation. When the high-power, quasi-continuous wave light source pump diode microfiber 118 of this embodiment is fired, polarization outcoupling is allowed to occur. The polarization outcoupling is accomplished by proper quarter-waveplate 116 adjustment, providing improved laser efficiency. In embodiments, the waveplate 116 may be a λ/4 waveplate 116, placing it into a parallel (P) polarization state. In other embodiments, the 1 μm marker laser 200, may be senkrecht (S)-polarized. Typically, P-polarized light is understood to have an electric field direction parallel to the plane of incidence on a device while S-polarized light has an electric field oriented perpendicular to that plane.

Figure 3:
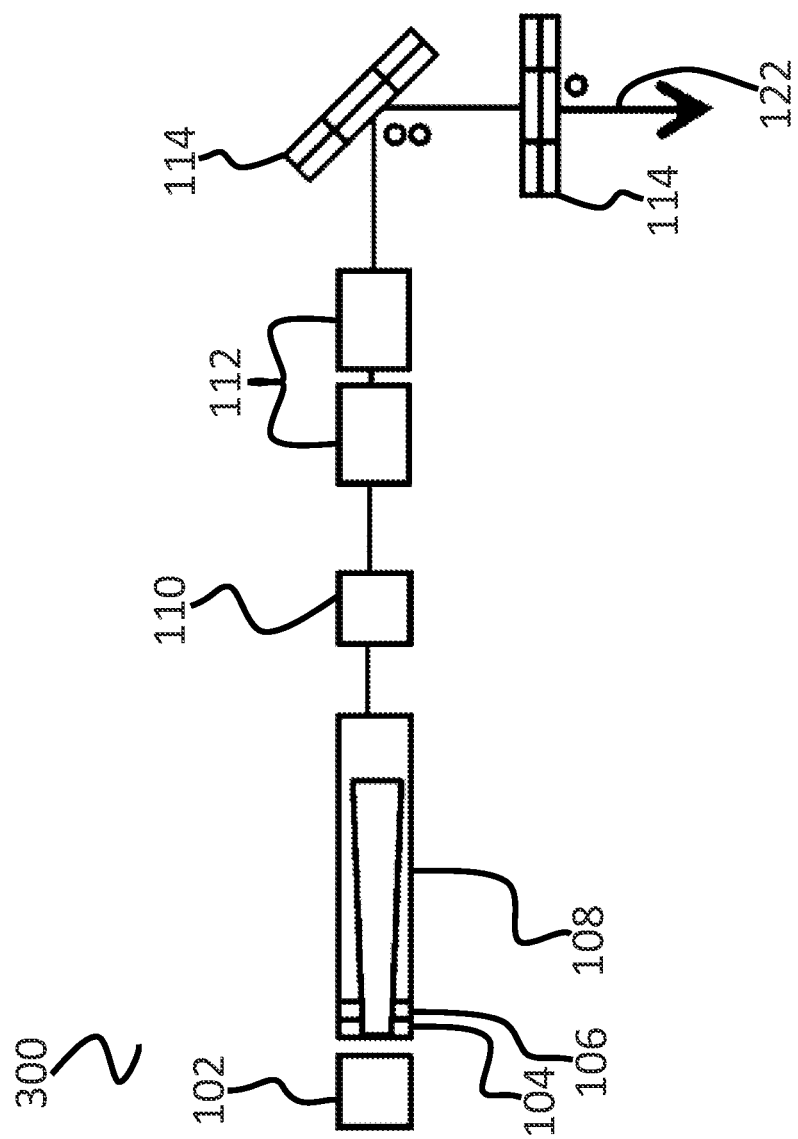
FIG. 3 is a schematic drawing of a 1.5 µm "eye-safe" laser transmitter firing a diffraction-limited, high power continuous wave light source pump diode, configured in accordance with one embodiment of the present invention.

Now referring to FIG. 3, a schematic drawing of a 1.5 μm "eye-safe" laser transmitter 300 firing a diffraction-limited, high power, continuous wave light source pump diode 102 is shown. As used in this disclosure, "eye-safe" should be understood to refer to operation in the 1530 to 1620 nm spectral range, which results in a raised eye-retina damage threshold as compared to 1064 nm lasers.

In embodiments, the transmitter 300 may be configured as an intracavity optical parametric oscillator (OPO), if formed using an external partially reflecting mirror (PR) mirror at 1.5 μm 114 HR S mode of polarizer 114 folding back to the dual HR of 1 μm 104 and 1.5 μm 106 on the left hand side gain element 108, as shown. This figure shows the eye-safe output is selected by firing the high power, quasi-continuous wave light source pump diode 102 and end-dumped 122, thus S-polarized, beam through the PR mirror.

To ensure intracaptivity OPO operation, in embodiments, the S-polarization dominates when the diffraction-limited, high power, continuous wave light source 102 gain element 108 is fired; the 1.5 μm laser end is dumped through the partially reflecting mirror.

Embodiments of the present invention adjust for any passive Q-switch 110 path saturation by balancing the load between multiple NLO crystals 112. Moreover, because the Q-switch 110 is passive rather than active, it does not demand high voltage input and is more suitable for applications which are voltage-sensitive or where high voltage power is otherwise unavailable or inconvenient.

Additionally, embodiments of the present disclosure allow for output selection by choosing between the pump diodes. In embodiments, the outputs are 1 μm for general marking and 1.5 μm for laser range-finding.

The present invention improves laser beam quality and decreases transmit aperture with fewer parts than the traditional apparatus. This allows for a small, lightweight and efficient lasing mechanism having numerous applications, especially applications having significant size restrictions, such as handheld target marking, or where such an apparatus is integrated into an existing electronics package.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A shared multi-wavelength laser resonator system with gain selected outcoupling, said system comprising:
   first and second independently pumped gain modules defining a lasing plane;
   first and second pump diodes positioned in the lasing plane, defining proximal and distal ends of said lasing plane, respectively, wherein said first pump diode is in optical communication with said first independently pumped gain module and wherein said second pump diode is in optical communication with said second independently pumped gain module;
   at least one polarizing waveplate positioned in the lasing plane, adjacent to said second independently pumped gain module, opposite said second pump diode, wherein said polarizing waveplate is in optical communication with said second independently pumped gain module;
   at least one polarizer positioned in the lasing plane and configured to act as a polarizer at both 1 μm and 1.5 μm;
   a plurality of non-linear optical crystals positioned in the lasing plane, adjacent to said first independently pumped gain module, opposite said first pump diode, wherein said plurality of non-linear optical crystals are in optical communication with said first independently pumped gain module and oriented to convert only S-polarized light; and
   a passive Q-switch positioned in the lasing plane between said non-linear optical crystals and said first independently pumped gain module;
   wherein said system is capable of allowing for output selection by choosing between the pump diodes.

2. The system of claim 1 wherein the output is selectable between 1 μm and 1.5 μm.

3. The system of claim 1 wherein said polarizer acts as both a high reflector for S polarized 1.5 μm light and a polarization outcoupler for P polarized 1 μm light.

4. The system of claim 1 wherein said waveplate is an adjustable quarter-waveplate which provides 1 μm polarized output.

5. The system of claim 1 wherein any path saturation of the passive Q-switch is adjusted by load balancing between said plurality of non-linear optical crystals.

6. The system of claim 1 wherein said gain modules are pumped in a complimentary manner to induce a constant net thermal lens of the system.

7. The system of claim 1 wherein said waveplate is configured to impart appropriate polarization rotation to enter a parallel oscillation state.

8. The system of claim 1 wherein said waveplate is configured to impart appropriate polarization rotation to enter a senkrecht oscillation state.

9. The system of claim 1 wherein the wavelength of laser radiation emitted by the system may be controlled through frequency conversion, enabled by the non-linear optical crystals.

10. The system of claim 1 wherein said passive Q-switch is comprised of an ion-doped crystal.

11. The system of claim 10 wherein said ion-doped crystal is Cr:YAG.

12. The system of claim 1 wherein said first gain module comprises dual high-reflection (HR) coatings, and said first gain module is adjacent to said first pump diode.

13. The system of claim 12 wherein said first pump diode is a high-power, quasi-continuous wave light source type pump diode.

14. The system of claim 13 wherein said second gain module comprises a single HR coating, and said second gain module is adjacent to said second pump diode.

15. The system of claim 14 wherein said second pump diode is a high-power, quasi-continuous wave light source type pump diode.

16. The system of claim 1 wherein said first and second gain modules are comprised of Nd:YAG.

17. The system of claim 1 wherein said non-linear optical crystals may be used as frequency doublers, providing second harmonic generation.

18. The system of claim 1 wherein said non-linear optical crystals may be used as optical parametric oscillators.

19. The system of claim 1 wherein said laser operates in a 1530 to 1620 nm spectral range, resulting in an increased eye-retina damage threshold as compared to 1064 nm lasers.

* * * * *